United States Patent
Bonnes

(10) Patent No.: US 7,178,164 B1
(45) Date of Patent: Feb. 13, 2007

(54) SYSTEM AND METHOD FOR ENSURING PROPER IMPLEMENTATION OF COMPUTER SECURITY POLICIES

(75) Inventor: Augustinus Hubertus Joseph Bonnes, Lee, NH (US)

(73) Assignee: CONSUL Risk Management, Herndon, VA (US)

( * ) Notice: Subject to any disclaimer, the term of this patent is extended or adjusted under 35 U.S.C. 154(b) by 846 days.

(21) Appl. No.: 10/323,465

(22) Filed: Dec. 18, 2002

Related U.S. Application Data

(60) Provisional application No. 60/353,274, filed on Feb. 1, 2002.

(51) Int. Cl.
*H04L 9/32* (2006.01)
*G06F 7/04* (2006.01)

(52) U.S. Cl. .......................................................... 726/2
(58) Field of Classification Search .................. 726/27, 726/28, 29, 25, 2
See application file for complete search history.

(56) References Cited

U.S. PATENT DOCUMENTS

| | | | | |
|---|---|---|---|---|
| 5,263,165 | A * | 11/1993 | Janis | 711/163 |
| 6,141,778 | A * | 10/2000 | Kane et al. | 726/4 |
| 6,735,701 | B1 * | 5/2004 | Jacobson | 726/1 |
| 6,983,377 | B1 * | 1/2006 | Beesley et al. | 709/229 |
| 2002/0002677 | A1 * | 1/2002 | Eade et al. | 713/164 |
| 2002/0095593 | A1 * | 7/2002 | Daniell et al. | 713/200 |

* cited by examiner

*Primary Examiner*—Matthew Smithers
(74) *Attorney, Agent, or Firm*—Mills & Onello, LLP

(57) ABSTRACT

Security profiles generated, amended, or deleted by an administrator are monitored to determine whether the administrator's actions are in compliance with known security policies. Out-of-compliance commands affecting the profiles are refused or otherwise modified to conform with the policies, depending on the circumstances. Feedback of the failure to comply may be provided and may take the form of a screen inquiry to the administrator, a notification to the administrator that the profile has been automatically modified, or a report of the transaction to a chief administrator. In this manner, negligent and intentional failures to comply with security policies by a local security administrator are mitigated or eliminated.

48 Claims, 5 Drawing Sheets

SYSTEM AND METHOD FOR ENSURING PROPER IMPLEMENTATION OF COMPUTER SECURITY POLICIES

RELATED APPLICATIONS

This application claims the benefit of U.S. Provisional Application Ser. No. 60/353,274, filed Feb. 1, 2002.

BACKGROUND OF THE INVENTION

In computer systems, particularly mainframe computer systems, security policies are employed in order to control access to system data and resources by various users. The policies are often times decreed at a high level in an organization, for example, by a chief system administrator, or chief security officer, in order to control system access at lower levels. Implementation of the general policies are commonly the responsibility of local administrators.

Implementation of general security policies involves the use of security management software that resides on the computer system. Such software tools are commonly referred to as "external security manager" software, or "resident security products". The security management software tools are programmed based on security descriptions, for example in the form of records, rules, rule sets, attributes or profiles (hereinafter referred to as security "profiles"), which represent a translation of the security policy into an encoded form that is recognized by the tools. The security profiles are commonly programmed by a local administrator, for example an administrator of a mainframe computer system. Common examples of contemporary security management tools include RACF and ACF2.

All aspects of system security are controlled according to the programming of the security profiles. For example, user access rights, user account names and passwords, rules related to user authorization, data resource access, and the like, are all implemented and controlled by the security management tools according to the programmed security profiles. However, complete responsibility for the security profiles, including programming of new security profiles, and modification and deletion of existing security profiles, is entirely under the jurisdiction of the local administrator. For this reason, there is no way to be certain that the local administrator is implementing security profiles on the system that are in compliance with the general policy. Any negligent or intentional failure to comply with the general policy by the local administrator could lead to a breach in security.

SUMMARY OF THE INVENTION

The present invention is directed to a system and method by which security profiles generated, amended, or deleted by an administrator are monitored to determine whether the administrator's actions are in compliance with known security policies. Out-of-compliance profiles are outright refused, or modified to conform, depending on the circumstances. Feedback of the failure to comply may take the form of a notification to the administrator that the profile has been automatically modified or refused, or a report of the transaction to a chief administrator. In this manner, negligent and intentional failures to comply by the local administrator are mitigated or eliminated.

In a first aspect, the present invention is directed to a system for monitoring the processing of security commands related to security profiles in a computer system. A profile monitor receives an input security command related to a security profile. A profile verification unit verifies the input security command using at least one reference security profile to generate a verified output security command. A profile processor processes the output security command.

The input security command comprises, for example, a command related to a new security profile or an existing security profile.

The profile verification unit may further comprise a profile modifier for modifying the input security profile command based on the verification to generate a modified command as the verified output security command.

The profile verification unit verifies the input security command by extracting information from the input security command and generating a verification request for the profile processor including the extracted information. In one example, the information comprises a value of a parameter of the input security command. In this case, the verification request includes the value for verifying the value using the at least one reference security profile.

The profile processor processes the verification request by accessing the at least one security profile to generate a response. The profile verification unit further receives the response to the verification request from the profile processor and verifies the extracted information of the input security command based on the response.

The profile verification unit may further comprise a profile modifier for modifying the input security profile command based on the verification of the extracted information to generate a modified command as the verified output security command. The modified command includes a parameter field having a value that is designated by at least one field of the at least one reference profile.

The profile verification unit may further comprise a command generator for generating at least one supplemental command that is provided prior to or following the output security command for providing a supplemental instruction to the profile processor or to the computer system.

The at least one reference profile comprises a set of security profiles that are accessible by the profile processor. The computer system may be based on the RACF security system, in which case the profile processor comprises a RACF processor, and the at least one reference profile comprises a set of RACF profiles having a resource class that is independent of that of general system RACF profiles accessed by the profile processor. The set of RACF profiles optionally utilize a RACF generic qualifier, or optionally utilize symbols that specify a value that is used to modify the input security command.

In another aspect, the present invention is directed to a method for monitoring the processing of security commands related to security profiles in a computer system. An input security command is received related to a security profile. The input security command is verified using at least one reference security profile to generate a verified output security command. The output security command is processed at a profile processor.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
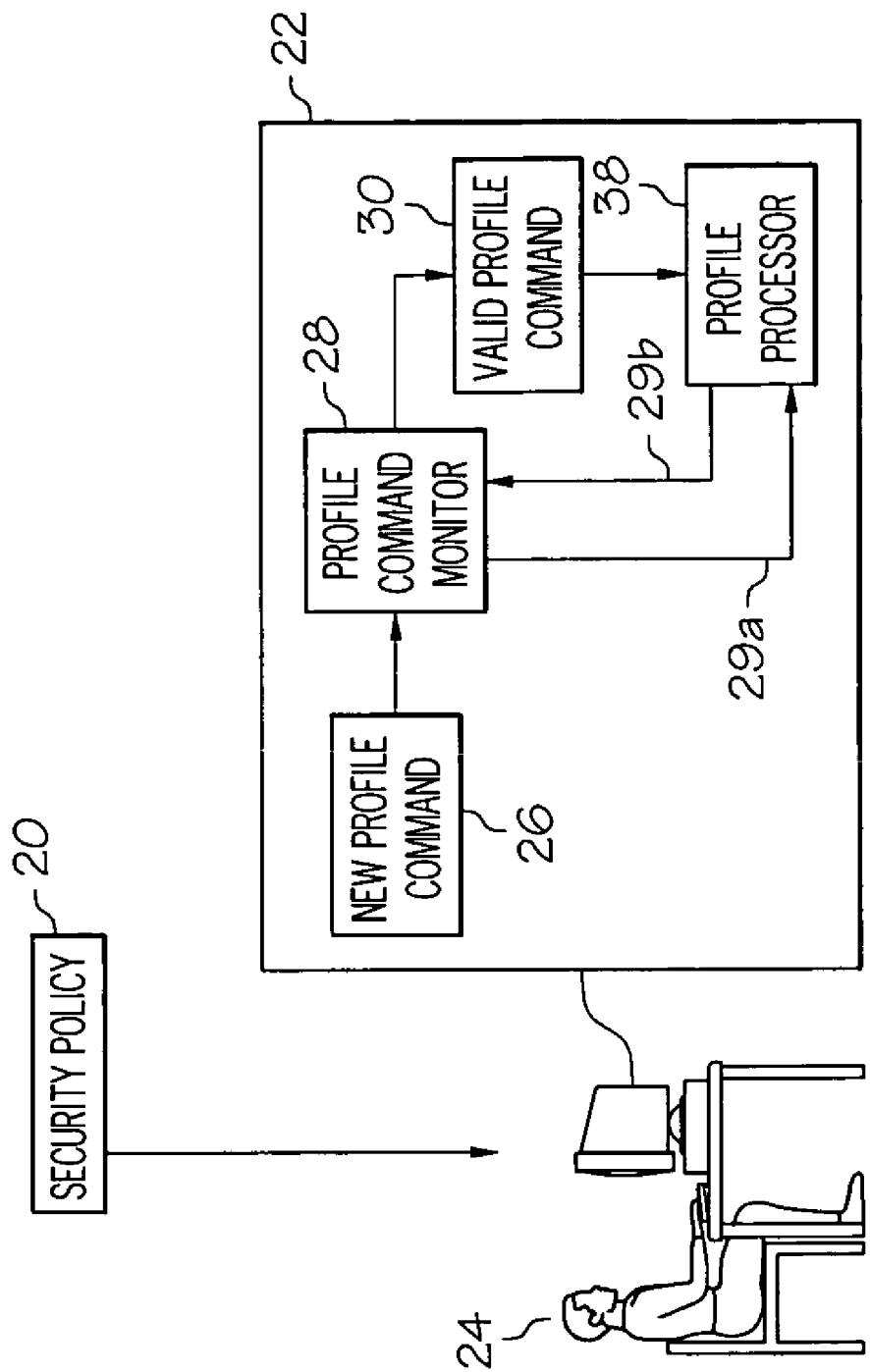
FIG. 1 is a block diagram of a system for monitoring security profile commands entered by a local administrator, in accordance with the present invention.

FIG. 1 is a block diagram of a system for monitoring security commands related to security profiles that are entered, modified, or otherwise accessed by a local administrator. A security policy 20 is administered from a high-level security officer or security administrator. The security policy 20 may, for example, involve rights related to user access to data resources, definition of user groups, definition of data resources, user passwords, and the like.

Implementation of the security policy 20 is realized through the programming of security profiles on a computer system 22, for example a mainframe computer system. A local administrator 24 has the ultimate responsibility for constructing the security profiles such that the computer system 22 is properly programmed so as to be operating in compliance with the security policy 20.

A local administrator 24, operating a terminal of the computer system 22, interprets the security policy 20 and enters a new security profile command 26 in the form of a computer security system command having a suitable format so as to be recognized as a command for entering, modifying, or deleting a security profile by the profile processor 38. Prior to processing of the newly entered profile command 26, the profile command is monitored at profile command monitor 28, in accordance with the present invention, to determine whether the command is in compliance with the security policy, or otherwise valid.

If compliance is determined, then the profile command monitor 28 outputs the new profile command 26 as a valid profile command 30. Valid profile commands 30 are provided to the profile processor 38 for processing. If the new profile command 26 fails to comply, the profile command monitor 28 may decide to take any of a number of actions, depending on the circumstances. For example, the profile command monitor 28 may decide to modify the newly entered profile command 26, in order to bring the profile command 26 into compliance. Such modification may take place automatically, without the transaction being made aware to the administrator 24, or alternatively, may take place by notifying the administrator that the profile command has been modified. Alternatively, the out-of-compliance profile command may be passed as valid, and a report of the transaction generated and transmitted to a higher-authority user, for example, the chief security officer for the system.

Figure 2:
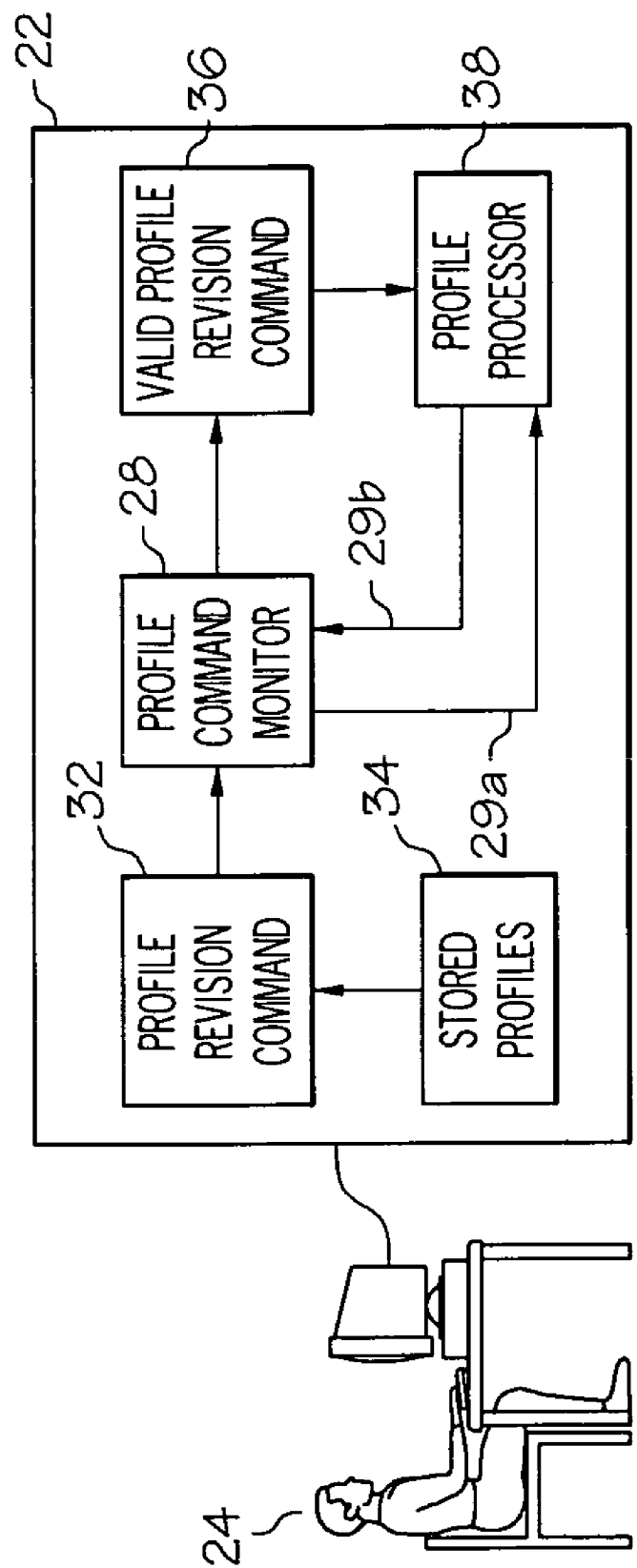
FIG. 2 is a block diagram of a system for monitoring the revision of security profiles by a local administrator, in accordance with the present invention.

FIG. 2 is a block diagram of a system for monitoring the revision of, for example including modification of, and deleting of, pre-existing security profiles by a local administrator. In this example, the administrator 24 enters a security command in an attempt to modify, or delete, an existing security profile 34 previously stored in the computer system that defines existing security-related operations of the computer system 22. In this example, the administrator enters a profile revision command 32 in an attempt to access the existing profile 34. The profile command monitor 28, as described above, determines whether the profile revision command 32 is in compliance with the security policy. If the profile revision command 32 is in compliance, then a valid profile revision command 36 is provided to the profile processor 38. If not, action is taken by the profile command monitor 28, to halt the transaction, modify the profile command to comply, or other action, depending on the circumstances, as described above.

In the embodiments shown in FIG. 1 and FIG. 2 above, the profile processor 38 provides a number of security system functions, including: 1) retrieving a security profile from the repository of profiles; 2) updating a profile in the repository of profiles; 3) verifying the authority of a user to access a resource using the most applicable profile in the repository; and 4) verifying the authority of a user to access the system. When a local administrator issues a new profile command 26 to add a new profile to the repository, the profile processor 38 will invoke function 1) to determine whether the new profile really doesn't exist at this time, followed by a function similar to function 3) to verify the authority to define the new profile, and function 2) to actually add the new profile to the repository.

In one embodiment of the present invention, the profile command monitor 28 utilizes function 3) of the profile processor in another way, namely to access a repository of "reference" profiles that define the security policies of the system. This type of access is described in further detail below. In this embodiment, the profile command monitor 28 utilizes the functions provided by the profile processor 38, for validating the newly entered, or revised profile command. In one example, as shown in FIGS. 1 and 2, requests 29a are generated by the profile command monitor 28 to request that the profile processor 38 validate the newly entered profile command 26, newly-revised profile command 32, or other profile-related action, against the set of reference profiles (described below). In this example, the requests 29a and reference profiles are formatted to comply with the facilities provided by the profile processor 38. In response, the profile command processor generates a verification signal 29b, that indicates whether the profile-related action is valid, or otherwise within compliance of the security policies, as programmed in the reference profiles. Following this, the profile command, once validated by the profile command monitor 28 as a valid profile command 30, 36, is transferred to the profile processor 38 for normal processing.

Figure 3:
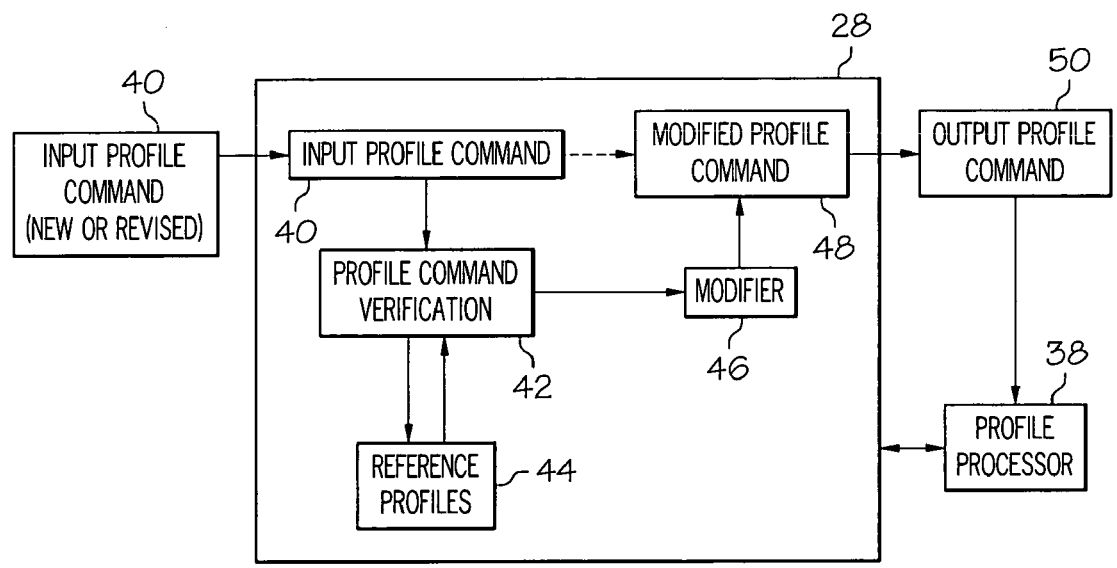
FIG. 3 is a block diagram of the monitoring system, illustrating the modification of an out-of-compliance profile command, in accordance with the present invention.

FIG. 3 is a detailed block diagram of the profile command monitor 28 of the present invention. In this embodiment, a profile command verification unit 42 is included for verifying the newly input profile command, profile revision command, or other profile-related action 40, referred to herein as an "input" profile command. Based on the input profile command 40, the profile command verification unit 42 verifies the input profile command 40 against one or more reference profiles 44. The reference profiles 44 may contain, for example, a set of reference values for data fields comprising the security profile command that are known to be valid. The reference profiles 44 may be stored, for example, in the security profile database of the computer system and accessed by the profile command monitor 28 via the profile processor 38. The profile command verification unit 42 ensures that the input profile command 40 entered by the administrator 24 is in compliance with security policies as defined by the reference profiles 44. Assuming that the input profile command 40 is in compliance, the input profile command 40 is output by the profile command monitor 28 as an output profile command 50, which is then ready for processing by the profile processor 38.

Assuming that the input profile command is determined by the profile command verification unit to be out-of-compliance, the embodiment of FIG. 3 further includes a profile command modifier 46 for modifying an out-of-compliance input profile command 40 to be within compliance. As described above, the profile verification unit 42 receives the input profile command 40 and verifies, using the reference profile 44, that the input profile command 40 is in compliance with the security policies. In this manner, the reference profile 44 may include a range or list of allowable parameters for various fields of the input security profile that ensure compliance. If a field, or multiple fields, are out-of-compliance (for example, if certain keywords or parameters are absent or out of the range of acceptable values), the profile command modifier 46 is instructed to modify the input profile command 40 in order to generate a modified profile command 48 that is in compliance with the security policy as defined by the reference profiles (for example by adding keywords and parameters, or modifying them to have an acceptable value). The generated modified profile command 48 is then transmitted as an output profile command 50 for processing by the profile processor 38. The profile command modifier 46 of the present invention thus provides an additional layer of flexibility by allowing for the modification of input profile commands, for example, certain fields or parameters of the input profile commands, that are otherwise valid, or syntactically correct, in order to enforce certain rules or limitations on those fields or parameters.

Figure 4:
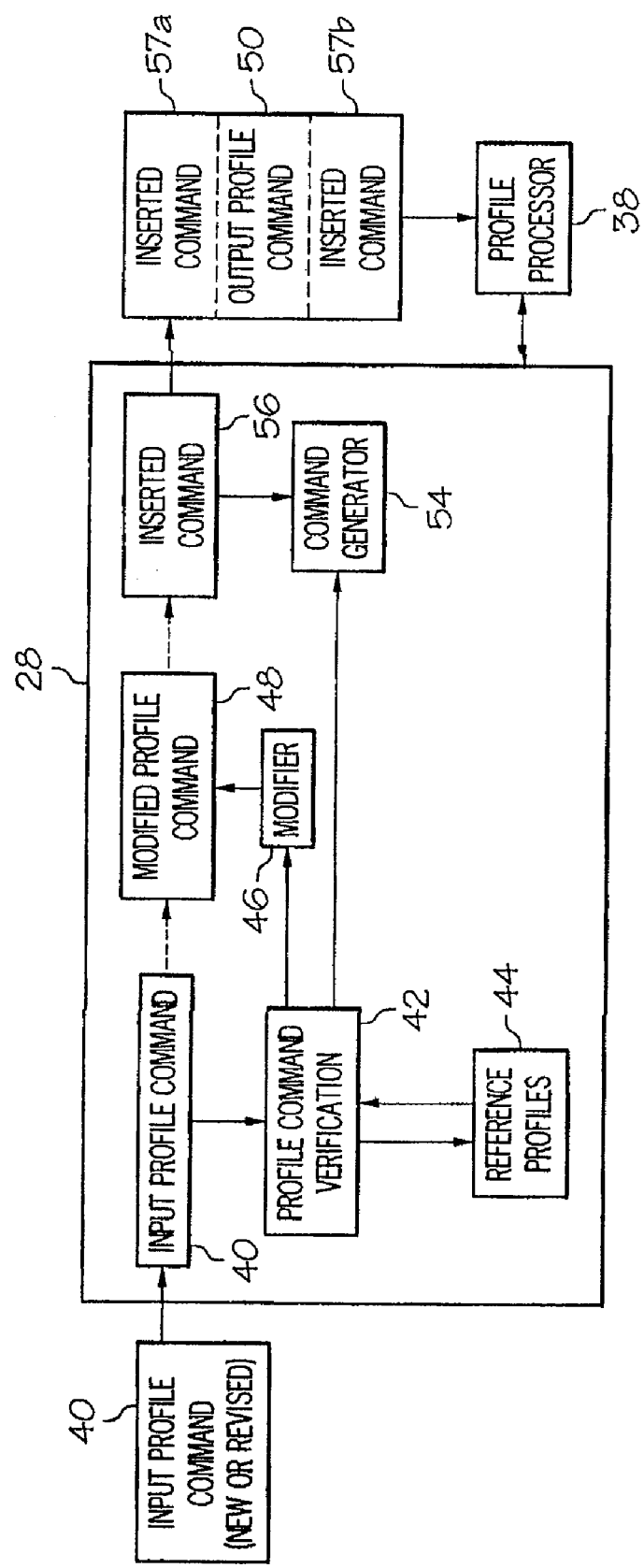
FIG. 4 is a block diagram of the monitoring system, illustrating the insertion of a system command prior to, or following, a modified profile command, in accordance with the present invention.

FIG. 4 is a second detailed block diagram of the profile command monitor 28, illustrating the insertion of a system security command prior to, and/or following, a modified (or unmodified) profile command. In the embodiment of FIG. 4, depending on the result of the verification of the input profile command 40 against the reference profiles 44 by the profile command verification unit 42, the input profile command 40 may be modified by profile command modifier 46 to create a modified profile command 48, as described above. In addition, in certain situations, the modified by profile command modifier 46 to create a modified profile command 48, as described above. In addition, in certain situations, the profile command verification unit 42 instructs a command generator 54 to generate a system command 56, which may be inserted prior to, and/or following, the modified profile command 48. The system command 56 may, for example, instruct the profile processor 38 to transmit a message reporting the attempted or ensuing transaction to a chief administrator. Alternatively, the system command 56 may generate a report of the security profile transaction for review by a security auditor. The system command 56 may comprise a security profile command, such as those described above, or may comprise a system command unrelated to security issues. The resulting modified profile command 48 is output as the output profile command 50, which may be preceded by, or followed by the inserted profile command 57a, 57b. The group of profile commands 57a, 50, 57b are then presented to the profile processor 38 for processing. In alternative embodiments, the inserted profile commands 57a, 57b may be added to an output profile command 50 comprising an input profile command 40 that is valid, and therefore not modified by modifier 46.

In order to gain a more detailed understanding of the present invention, the invention will now be described in the context of a RACF-based security management system operating on the OS/390 operating system. It will be understood, however, that the present invention is applicable to other operating systems, security systems, programming languages and computer architectures.

Background information on the RACF security manager will now be provided. The RACF security manager is available from International Business Machines, Inc. Details of the system are available in the form of manuals: RACF Command Language Reference (order number SA22-7687); RACF Security Administrator's Guide (order number SA22-7683); RACF Auditor's Guide (order number SA22-7684); RACF System Programmer's Guide (order number SA22-7681).

Resources and users of the computer operating system, for example OS/390, may be described in RACF. This description is accomplished through the use of RACF profiles. Each resource in the system, for example, a data set, a CICS transaction, or the like, can be described in RACF in a resource profile. Historically, RACF separates data sets from other types of resources, the other types being referred to as general resources. This separation is also reflected in the RACF command syntax, where two distinct sets of commands are used: one set of commands for data sets and the other for general resources. Users are described according to user profiles. For efficiency purposes, RACF allows users to be collected into RACF "groups". These groups may be used for several purposes, including access to resources and authority to modify profiles.

Access to the resources is controlled via the resource profiles. These resource profiles may be "discrete" (one profile is used to describe exactly one resource) or "generic" (one profile may be used to describe a number of different resources). In contemporary systems, generic profiles are commonly used. The resource profiles contain a so-called universal access (or "UACC") and two forms of access lists (or "ACL"). The UACC controls the access capabilities of all users, provided a given user has not been specified in the ACL. A Standard ACL comprises a list of users and groups and their respective access levels. A conditional ACL comprises a list of users and some condition (such as program, terminal or console), combined with corresponding access rights.

Authorization to modify profiles (the descriptions in the RACF database) is based on the ownership of the profile. The owner of a profile must be an existing RACF user or group. If a user is specified as the owner, then only that particular user is authorized to maintain the profile. If a group is specified as the owner, then all individuals with administrative authorization within the group (group-SPECIAL) can maintain the profile.

As with users and resources, groups are also described in RACF through the use of profiles. These group profiles, in turn, have an owner, and, again, the owner may be used to authorize others to modify the definition of the group. However, when the group-SPECIAL is used as authorization method, then this group-SPECIAL user also has authorization over many of the subgroups of the group. This percolation of group-SPECIAL authority is more fully described in the RACF Security Administrator's Guide (referenced above) in the section called "User Attributes at the Group Level" in Chapter 3: "Defining Groups and Users".

Authorization to define, modify and delete RACF profiles is primarily based on the RACF profile itself. Sometimes other authorizations (like system-SPECIAL) may be used as well; however, these are not standard authorizations available to normal users. However, the change itself (the new value being stored in the profile) is often not controlled by RACF in any way. For instance, assuming the user to be the owner of a group, the user-owner can connect any user in the system to the group. RACF does not verify which users are being connected or removed. Another example is the changing of an owner and ACL of a profile. The owner may specify any other user or group to be the new owner, in effect, "giving-away" an owned profile to anyone.

The above examples are typical of the type of actions that the systems and methods of the present invention prevent from occurring. It is desirable to monitor not only the profile that is being changed and which attribute is being changed (both functions already provided by the RACF system), but also the value that the profile or attribute is being changed into. The present invention provides this capability, namely to control the new value of any field, option or attribute of any profile.

Using RACF commands, a user has the ability to add, change or delete RACF profiles and to define system-wide options. The RACF system permits only those users that are defined in RACF to issue the RACF commands. In conventional systems, command-related problems are caused by the fact that RACF permits an owner of a profile to change any attribute of the profile, as long as this does not increase the authority or access capability of the owner itself. As mentioned before, security policy directors often times do not want to allow users this level of freedom, since users can change the access rules to effectively disable RACF access control for their resources. This exposure can be reduced by disallowing the RACF commands entirely (this may be done via RACF program protection of the RACF commands), or by coding of RACF exits, as discussed in the RACF System Programmers Guide referenced above. However, each solution has limitations. For example, disallowing the RACF commands prevents legitimate operations that an owner of a resource might want to perform. On the other hand, coding of RACF exits often does not provide the level of control desired in a system installation, or does provide such at considerable cost to an organization.

The systems and methods of the present invention overcome these limitations by providing for the validation of entered RACF commands in a manner that is more flexible, and more cost effective, than the conventional approach of coding RACF exits. In this manner, keywords and parameters of the input RACF command are verified in view of the set of reference profiles before any significant RACF processing has taken place. Further, the present invention offers the additional capability of modifying the command keywords and parameters in such a manner that the RACF command processor does not distinguish the modified command from the command as originally entered by the terminal-user.

In an example embodiment of the present invention, policy rules are implemented through the definition of RACF profiles. The profiles that control the operation of the profile command monitor 28, referred to herein as "reference profiles", are preferably defined in an independent resource class, for example class "$C4R". Definition of the reference profiles is made, for example, as part of an installation process of the profile command monitor 28.

Generally, the reference profiles used for policy specification include at least four qualifiers. In this example, the first qualifier is always the resource class identifier $C4R, which indicates that the profile is part of the resource class that includes the reference profiles. The second qualifier indicates the type of profile that this reference profile applies to. Examples of the second qualifier include USER, GROUP, DATASET, TCICSTRN. The third qualifier indicates the function or field that is controlled. Examples include ID, OWNER, NOTIFY, SPECIAL, UACC. The fourth qualifier specifies a value for the particular function or field. Examples include READ, JOIN, groupname. Finally, the fifth, and any remaining, qualifiers describe the profile to which the security policy applies. It is primarily intended to allow for exceptions to the rules. Two example policy rules that fit the general pattern are given below:

$C4R.DATASET.UACC.READ.SYS1.**
  The authority to set the UACC to READ for DATASETS that match the pattern SYS1.**
$C4R.USER.DFLTGRP.SYS1.**
  The authority to select the group SYS1 as DFLTGRP for any user In addition, special values for certain qualifiers can be implemented in the profiles. For example, /SCOPE is used to refer to target profiles (users, groups, datasets, etc) that are "not in scope". The /SCOPE policy profiles control the authorizations to handle the "not in scope" profiles. Other special qualifiers are indicated by an "=" sign. These are used to describe "must be equal to" type of policies. Examples of these types of special qualifiers are given below.

$C4R.USER.PASSWORD.=DFLTGRP
  The authority to set the password equal to the default group of the user (RACF's default value).
$C4R.USER.=OWNER.IBM*
  This profile defines a mandatory value for the owner of userids that match the pattern IBM*

Tables of reference profiles such as these are stored in a portion of system memory that is accessible by the RACF profile processor 38. Taken together, the reference profiles define the security policies of the system.

Figure 5:
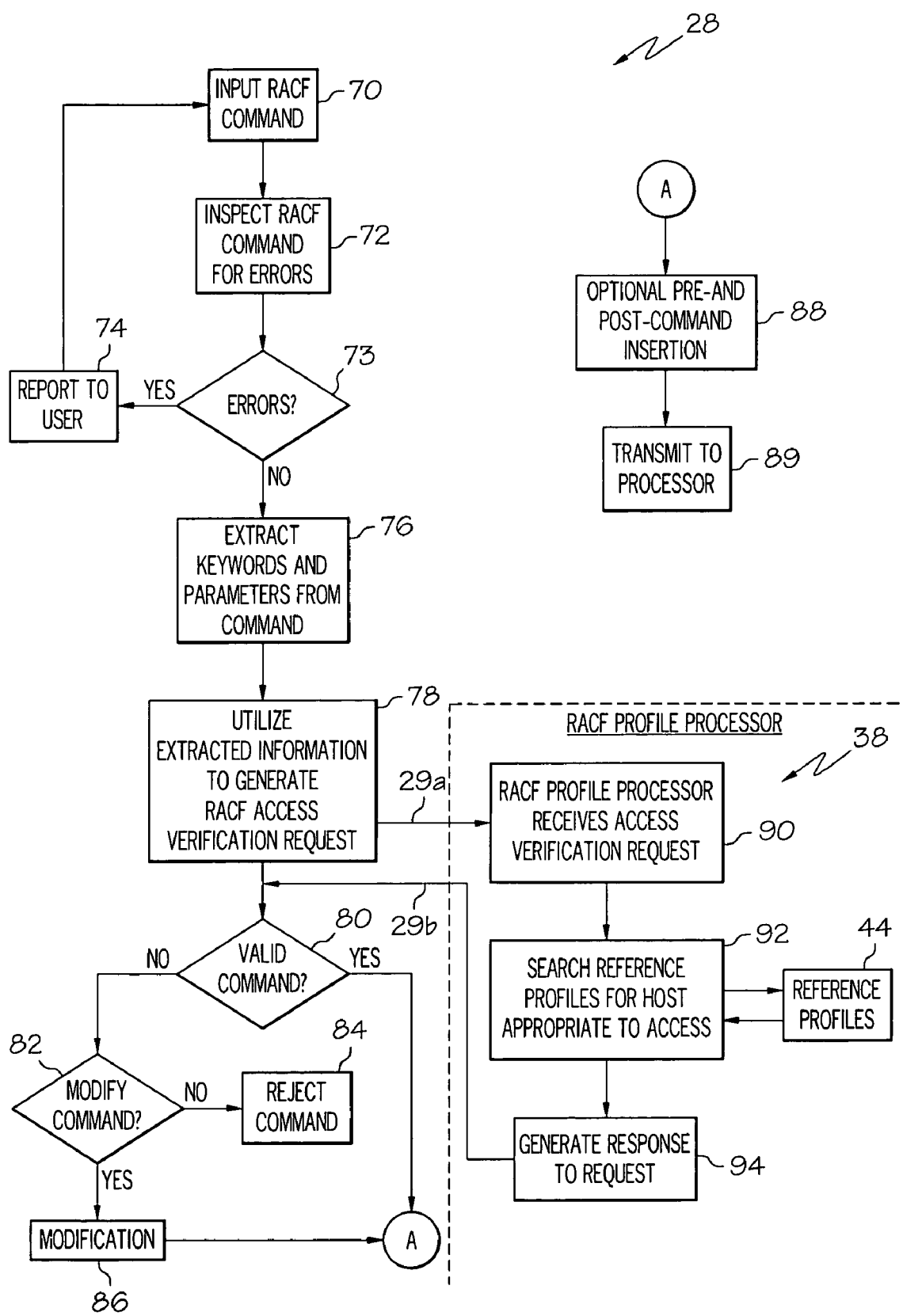
FIG. 5 is a flow diagram of the function of the profile monitor 28 of FIGS. 1–4, as embodied in a RACF-based security management system.

FIG. 5 is a flow diagram that describes the function of the profile monitor 28 of FIGS. 1–4, as embodied in a RACF-based security management system. Reference is made throughout the following discussion of FIG. 5 to the components of the system as illustrated in FIGS. 1–4. In the context of the RACF system, the input profile commands 40, whether referred to as new profile commands 26, or revised profile commands 32, of FIGS. 1–4, take the form of RACF security commands that are processed for accessing security profiles that define the security policies implemented in the system.

The RACF command (for example, referred to above as an input profile command 40) is initially input into the system at step 70. The RACF command is entered according to a predefined format that includes multiple fields referred to as keywords and parameters. The RACF command is related to a RACF security profile and the keywords and parameters of the command can be considered as fields of the RACF profile. The profile command monitor 28 intercepts the RACF command, prior to processing by the RACF profile processor (for example, referred to above as the "profile processor" 38), for analysis and verification. The RACF command is inspected for obvious syntax errors at steps 72 and 73. Such errors can be optionally reported back to the user 74 to give the user has an opportunity to correct the error, in a manner similar to the standard RACF command interface.

Assuming the input RACF command is syntactically correct, the keywords and parameters of the RACF command are extracted at step 76. Next, at step 78, the extracted information is parsed into a processor request in a format that is recognizable by the RACF processor. In one example, illustrated below, this translation takes the form of a RACF "access verification" request 29a.

During access verification, the RACF profile processor 38 receives the access verification request 29a at step 90, and searches, at step 92, the prestored reference profiles 44 for the most appropriate profile for a given access. The extracted keywords and parameters of the access verification request 29a are evaluated and verified by the RACF processor against the system security policies as specified in the set of reference security profiles 44 (see FIGS. 3 and 4). In one example, the reference security profiles comprise a set of RACF profiles that are stored in a resource class available to the RACF processor that is independent of the standard security profiles accessed by the RACF command processor. In the examples provided herein, the resource class used for the reference profiles is referred to as the "$C4R" class. Based on the result of the search, and the rules obtained at the reference profile selected, the RACF profile processor 38 returns a response 29b, at step 94, to the calling process, namely the profile command verification unit 42 requesting the access. In a typical example, the returned information is in the form of a positive ("yes"), negative ("no"), or uncertain ("I don't know") answer.

At step 80, if the keywords and parameters of the input RACF command 40 are determined to violate the security policy as defined by the reference profiles, i.e. the command is "invalid", the profile monitor 28 determines at step 82 whether or not the command is to be modified. If modification of an invalid command is not possible or desired, the invalid RACF command is rejected at step 84. If modification is possible, for example by suppressing a keyword or by altering a field of the command that is in violation, then the modification process accomplishes this at step 86. If, at step 80, the input RACF command is determined by the profile monitor to be acceptable, then the process continues.

Following this, the profile command monitor 28 includes, at step 88, the optional capability of specifying an additional command to be executed prior to the entered or modified RACF command (the "pre-command"), and an additional command to be executed following the entered or modified RACF command (the "post-command").

Thereafter, the RACF command or commands are transmitted to the RACF processor, at step 89, as valid commands 30, 36 (see FIGS. 1 and 2) for execution.

It is noted that the enhanced level of scrutiny and control over the entry and modification of system RACF profiles (user, group, resource profiles) offered by the present invention applies equally well to the monitoring of profile commands involving the creation, modification, and deletion of the reference profiles themselves. This allows for a closed, self contained system, where the implementation of the policies, as reflected in the reference profiles, can only be changed if the policies allow for a change of these reference profiles.

An example of a typical transaction between the profile command monitor 28 and the profile processor 38 is now provided for the RACF system environment.

Initially, a local administrator enters the following command to add a new profile to the profile repository:
 ADDSD 'SYS1.TEST.DATA' UACC(UPDATE)
Assuming that the profile command monitor 28 is not present, the RACF profile processor 38 operates to: determine if the local administrator has sufficient authority to define datasets that start with "SYS1"; determine if the dataset profile 'SYS1.TEST.DATASET' does not yet exist; and add the new profile to the RACF profile repository.

Assuming that the profile command monitor 28 is present, the profile monitor operates to extract various components from the input profile command (see step 76 of FIG. 5):
  A) The profile to be added: 'SYS1.TEST.DATA'
  B) The absence of an OWNER for the new profile
  C) The presence of a value for the UACC (the value is UPDATE)

The profile command monitor, at step 78 of FIG. 5, then translates the three components into corresponding reference profiles, and checks the authority of the local administrator for each component. For the example given above, the corresponding reference profiles are:
  a) $C4R.DATASET.ID.SYS1.TEST.DATA
  b) $C4R.DATASET./OWNER.SYS1.TEST.DATA
  c) $C4R.DATASET.UACC.UPDATE.SYS1.TEST.DATA The check for the authority of the local administrator is, for example, performed via a request 29a to the RACF profile processor 38 for "resource access" (See function (3) in the description of the profile processor functions above). In RACF command terminology, this request takes the form of:
 RACROUTE REQUEST=AUTH, ATTR=READ, CLASS=$C4R,
  ENTITY=$C4R.DATASET.ID.SYS 1.TEST.DATA This RACF operation is fully described in the IBM manual: Security Server RACROUTE Macro Reference (order number SA22-7692)

As a result of the request 29a, the RACF profile processor 38 responds by searching for the best matching profile in the profile repository for each of these three reference profiles. For the purpose of example, it is assumed that the following reference profiles are present in the profile repository:
  1) $C4R.DATASET.ID.SYS1.**
  2) $C4R.DATASET.ID.**
  3) $C4R.DATASET./OWNER.SYS1.**
  4) $C4R.DATASET.UACC.READ.SYS1.**
  5) $C4R.DATASET.UACC.READ.**
  6) $C4R.DATASET.UACC.**

In this case, the search for reference profile a) listed above will yield profile 1) as the best matching reference profile. The search for reference profile b) listed above will yield profile 3) as the best matching reference profile. The search for reference profile c) listed above will yield profile 6) as the best matching reference profile.

Using the best matching reference profiles 1), 3) and 6), the RACF profile processor 38 will check for access, and may for instance provide responses 29b "Yes", "Yes" and "No" to the three requests. As a result, the profile command monitor 28 will issue an error message indicating the specified value for the UACC is not allowed, and prevent the command from executing. (For example, an output command 50 (see FIGS. 3 and 4), is not generated, but instead, the RACF processor is to halt processing of the command.)

In another example, assuming the input command 40 to be:
 ADDSD 'SYS1.TEST.DATA' UACC(READ)

then the translated profiles would be a) and b) as above, as well as:
  c) $C4R.DATASET.UACC.READ.SYS1.TEST.DATA In this case the best matching reference profiles in the profile repository would be determined as reference profiles 1), 3) and 4), and the response 29b from the RACF profile processor 38 take the form "Yes", "Yes" and "Yes". In this case, the profile command monitor 28 allows the unmodified input command 40 to be passed as an output command 50, which is then executed by the RACF profile processor 38.

In another example, assuming the input command 40 to be:

ADDSD 'XYZ.TEST.DATA' UACC(READ)

then the translated profiles would be a) and b) as above, as well as:

c) $C4R.DATASET.UACC.READ.XYZ.TEST.DATA

In this case the best matching reference profiles in the profile repository would be determined as reference profiles 1), 3) and 5), and the response 29b from the RACF profile processor 38 takes the form of "Yes", "Yes" and "No", as in the first example.

The response 29b of the RACF profile processor 38 is based on the access list and UACC as specified for the best matching reference profile. The best matching reference profile will be different depending on the value specified for the UACC (READ vs UPDATE), and the profile name specified by the local admin (SYS1.TEST.DATA vs XYZ.TEST.DATA). Generic patterns (e.g. symbol "**") are defined in the profile repository to allow for efficiency and ease of administration. Using the example reference profiles above, it is not necessary to anticipate all possible dataset profiles (XYZ..., ABC..., etc.) but only to accommodate the exceptions to the general rule (SYS1...).

Following processing by the profile command monitor 28 as described above, the output command 50 is transferred to the RACF profile processor for normal RACF processing.

In the above example, the installation policy regarding the UACC has been specified as "only those datasets starting with SYS1, may have a UACC equal to READ, and only to READ, and nothing else". This policy translated into the three defined reference profiles listed above:

4) $C4R.DATASET.UACC.READ.SYS1.**
5) $C4R.DATASET.UACC.READ.**
6) $C4R.DATASET.UACC.**

These three reference profiles can be respectively interpreted as "the authority to specify UACC(READ) for datasets starting with SYS1", "the authority to specify UACC(READ) for all other datasets", and "the authority to specify any UACC for any dataset".

Alternatively, the installation could have phrased the installation policy regarding UACC as "all SYS1 datasets should have a UACC of READ, and all other datasets should have a UACC of NONE". In that case, the reference profiles would be:

4) $C4R.DATASET.=UACC.SYS1.**
5) $C4R.DATASET.=UACC.**
6) Not used.

In this case, the profile command monitor 28 further issues a request to the RACF processor to check access to the reference profile:

$C4R.DATASET.=UACC.SYS1.TEST.DATA

The check for this reference profile is performed. In the absence of a matching reference profile (as in the previous example), the RACF profile processor 38 responds 29b to this check with the answer "undecidable", or "I don't know". In this case, the profile command monitor 28 considers the related policy as being "not implemented" and ignores it. In most situations this means that the profile command monitor 28 will not consider this to be a violation of the policy and thus the corresponding keyword or parameter will not be rejected. However, in the current example, a reference profile has been defined, and therefore, the RACF processor will not respond "undecidable", but instead will respond "Yes" or "No". If the answer from the RACF profile processor 38 is "Yes", the profile command monitor 28 will request the RACF profile processor 38 to provide additional information regarding the profile. In this case, the field that is needed by the profile command monitor 28 is the APPLDATA field. The request to retrieve that piece of information is again of the form used for program access to the RACF profile processor:

RACROUTE REQUEST=EXTRACT,
ENTITY=$C4R.DATASET.=UACC.SYS1.TEST.DATA,
  FIELDS=APPLDATA

The system administrator, when specifying the reference (=policy) profile, should have specified a value for the APPLDATA field. In one example, this is accomplished via the following command:

RDEF $C4R $C4R.DATASET.=UACC.SYS1.**APPLDATA('READ')

The reference profile has the value READ for the APPLDATA field, and thus the request to retrieve the APPLDATA yields the value 'READ'. This value is now used in the output profile command (48). The input RACF profile command as entered by the local administrator is thus modified by the modifier 46 of the profile command monitor 28 to become the following modified profile command 48 (see FIGS. 3 and 4):

ADDSD 'SYS1.TEST.DATA' UACC(READ)

The resulting RACF output command 50 based on the modified profile command 48 will be provided to the RACF profile processor 38 independent of the possible value for the UACC as specified by the local administrator, or even the absence/presence of such a value.

Assuming that the original input profile command was as in the illustration above:

ADDSD 'XYZ.TEST.DATA' UACC(READ)

then the best matching mandatory value reference profile would have been profile 5) above. This may have a different value for the APPLDATA field, and thus would result in a different modified profile command 48 being generated.

In the example of FIG. 4 illustrated and described above, optional pre- and post commands 57a, 57b are generated and output by the profile monitor 28 prior to and following the output profile command 50. In this example, a process similar to the one described above occurs. The APPLDATA value from the reference profiles is retrieved and used to specify the pre- and post-commands 57a, 57b. An example is in the form of the ALTUSER command (the command used to modify a user profile in the profile repository).

ALTUSER XYZZY SPECIAL

For this example, the applicable reference profile for the post-command would be:

7) $C4R.ALTUSER.=PSTCMD.SPECIAL

The APPLDATA field may contain information such as 'SEND "System SPECIAL attribute given to user &profile by" User(SYSADM)' resulting in a message being sent to the system administrator that user XYZZY was given system administrator's authority.

In the above illustration, it is demonstrated that RACF generic profiles can be used to reduce the number of required reference profiles. In addition, it is possible to implement specific exceptions to a general policy, by using a significant part of the name (or the entire name) of the profile as part of the reference profile.

Additional flexibility in specifying the contents of certain fields can also be achieved. For example programming of the profile command monitor allows for the use of special symbols, such as "&racuid(4)", within the name of the reference profile, to refer to attributes of the local administrator. In the example, "&racuid(4)" stands for the first four characters of the local administrator's userid, and it can be used by the profile command monitor 28 to allow an administrator to define a new userid that has those same first four characters. Furthermore, special symbols, such as "&myowner", can be used in one or more fields of the reference profile, to refer to attributes of the local administrator. In the example, &myowner stands for the owner of the local admin's userid, and it is used by the profile command monitor 28 to specify that the owner of a new userid will be the same as the owner of the local administrator's userid.

In addition, special symbols, such as "/uacc", can be incorporated into in the name of the reference profiles, as a method for providing default values for parameters that are absent. Symbols such as "/scope", can be implemented to refer to a subset of all profiles defined. Symbols, such as "=uacc", can be implemented to refer to mandatory values that overrule possible values for parameters as specified by the local administrator In this manner, the present invention offers a high level of flexibility and controllability over computer security functions, in a manner that is cost effective for system security administrators.

While this invention has been particularly shown and described with references to preferred embodiments thereof, it will be understood by those skilled in the art that various changes in form and details may be made herein without departing from the spirit and scope of the invention as defined by the appended claims.

I claim:

1. A system for monitoring the processing of security commands related to security profiles in a computer system, comprising:
   a profile monitor for receiving an input security command related to a security profile;
   a profile verification unit for verifying the input security command using at least one reference security profile to generate a verified output security command; and
   a profile processor for processing the output security command.

2. The system of claim 1 wherein the input security command comprises a command related to a new security profile.

3. The system of claim 1 the input security command comprises a command related to an existing security profile.

4. The system of claim 1 wherein the profile verification unit further comprises a profile modifier for modifying the input security profile command based on the verification to generate a modified command as the verified output security command.

5. The system of claim 1 wherein the profile verification unit verifies the input security command by extracting information from the input security command and generating a verification request for the profile processor including the extracted information.

6. The system of claim 5 wherein the information comprises a value of a parameter of the input security command, and wherein the verification request includes the value for verifying the value using the at least one reference security profile.

7. The system of claim 5 wherein the profile processor processes the verification request by accessing the least one security profile to generate a response.

8. The system of claim 7 wherein the profile verification unit further receives the response to the verification request from the profile processor and verifies the extracted information of the input security command based on the response.

9. The system of claim 5 wherein the profile verification unit further comprises a profile modifier for modifying the input security profile command based on the verification of the extracted information to generate a modified command as the verified output security command.

10. The system of claim 9 wherein the modified command includes a parameter field having a value that is designated by at least one field of the at least one reference profile.

11. The system of claim 1 wherein the profile verification unit further comprises a command generator for generating at least one supplemental command that is provided prior to or following the output security command for providing a supplemental instruction to the profile processor.

12. The system of claim 1 wherein the at least one reference profile comprises a set of security profiles that are accessible by the profile processor.

13. The system of claim 12 wherein the computer system is based on the RACF security system, wherein the profile processor comprises a RACF processor, and wherein the at least one reference profile comprises a set of RACF profiles having a resource class that is independent of that of general system RACF profiles accessed by the profile processor.

14. The system of claim 12 wherein the set of RACF profiles utilize a RACF generic qualifier.

15. The system of claim 12 wherein the set of RACF profiles utilize symbols that specify a value that is used to modify the input security command.

16. The system of claim 12 wherein the set of RACF profiles utilize symbols that specify that a predefined portion of a parameter value of the input security command matches the at least one reference profile, or that specify a subset of a plurality of the reference profiles, or for identifying or defining default values for parameters that are absent.

17. A method for monitoring the processing of security commands related to security profiles in a computer system, comprising:
   receiving an input security command related to a security profile;
   verifying the input security command using at least one reference security profile to generate a verified output security command; and
   processing at a profile processor, the output security command.

18. The method of claim 17 wherein the input security command comprises a command related to a new security profile.

19. The method of claim 17 wherein the input security command comprises a command related to an existing security profile.

20. The method of claim 17 further comprising modifying the input security profile command based on the verification to generate a modified command as the verified output security command.

21. The method of claim 17 wherein verifying the input security command comprises extracting information from the input security command and generating a verification request for the profile processor including the extracted information.

22. The method of claim 21 wherein the information comprises a value of a parameter of the input security command, and wherein the verification request includes the value for verifying the value using the at least one reference security profile.

23. The method of claim 21 wherein the profile processor processes the verification request by accessing the least one security profile to generate a response.

24. The method of claim 23 wherein verifying further comprises receiving the response to the verification request and verifying the extracted information of the input security command based on the response.

25. The method of claim 24 further comprising modifying the input security profile command based on the verification of the extracted information to generate a modified command as the verified output security command.

26. The method of claim 25 wherein the modified command includes a parameter field having a value that is designated by at least one field of the at least one reference profile.

27. The method of claim 17 further comprising generating at least one supplemental command that is provided prior to or following the output security command for providing a supplemental instruction to the profile processor.

28. The method of claim 17 wherein the at least one reference profile comprises a set of security profiles that are accessible by the profile processor.

29. The method of claim 28 wherein the computer system is based on the RACF security system, wherein the profile processor comprises a RACF processor, and wherein the at least one reference profile comprises a set of RACF profiles having a resource class that is independent of that of general system RACF profiles accessed by the profile processor.

30. The method of claim 28 wherein the set of RACF profiles utilize a RACF generic qualifier.

31. The method of claim 28 wherein the set of RACF profiles utilize symbols that specify a value that is used to modify the input security command.

32. The method of claim 28 wherein the set of RACF profiles utilize symbols that specify that a predefined portion of a parameter value of the input security command matches the at least one reference profile, or that specify a subset of a plurality of the reference profiles, or for identifying or defining default values for parameters that are absent.

33. A computer program product comprising computer program code stored in at least one memory, when executed by at least one processor, the computer program product configured to perform a method for monitoring the processing of security commands related to security profiles in a computer system, the method comprising:
   receiving an input security command related to a security profile;
   verifying the input security command using at least one reference security profile to generate a verified output security command; and
   processing at a profile processor, the output security command.

34. The computer program product of claim 33 wherein the input security command comprises a command related to a new security profile.

35. The computer program product of claim 33 wherein the input security command comprises a command related to an existing security profile.

36. The computer program product of claim 33, wherein the method further comprises modifying the input security profile command based on the verification to generate a modified command as the verified output security command.

37. The computer program product of claim 33 wherein verifying the input security command comprises extracting information from the input security command and generating a verification request for the profile processor including the extracted information.

38. The computer program product of claim 37 wherein the information comprises a value of a parameter of the input security command, and wherein the verification request includes the value for verifying the value using the at least one reference security profile.

39. The computer program product of claim 37 wherein the profile processor processes the verification request by accessing the least one security profile to generate a response.

40. The computer program product of claim 39 wherein verifying further comprises receiving the response to the verification request and verifying the extracted information of the input security command based on the response.

41. The computer program product of claim 40 wherein the method further comprises modifying the input security profile command based on the verification of the extracted information to generate a modified command as the verified output security command.

42. The computer program product of claim 41 wherein the modified command includes a parameter field having a value that is designated by at least one field of the at least one reference profile.

43. The computer program product of claim 33 wherein the method further comprises generating at least one supplemental command that is provided prior to or following the output security command for providing a supplemental instruction to the profile processor.

44. The computer program product of claim 33 wherein the at least one reference profile comprises a set of security profiles that are accessible by the profile processor.

45. The computer program product of claim 44 wherein the computer system is based on the RACF security system, wherein the profile processor comprises a RACF processor, and wherein the at least one reference profile comprises a set of RACF profiles having a resource class that is independent of that of general system RACF profiles accessed by the profile processor.

46. The computer program product of claim 44 wherein the set of RACF profiles utilize a RACF generic qualifier.

47. The computer program product of claim 44 wherein the set of RACF profiles utilize symbols that specify a value that is used to modify the input security command.

48. The computer program product of claim 44 wherein the set of RACF profiles utilize symbols that specify that a predefined portion of a parameter value of the input security command matches the at least one reference profile, or that specify a subset of a plurality of the reference profiles, or for identifying or defining default values for parameters that are absent.

* * * * *